United States Patent [19]

Cherukuri et al.

[11] Patent Number: 5,057,328
[45] Date of Patent: Oct. 15, 1991

[54] FOOD ACID DELIVERY SYSTEMS CONTAINING POLYVINYL ACETATE

[75] Inventors: Subraman R. Cherukuri, Towaco, N.J.; Gul Mansukhani, Staten Island, N.Y.; Steven M. Faust, Stanhope, N.J.

[73] Assignee: Warner-Lamber Company, Morris Plains, N.J.

[21] Appl. No.: 488,809

[22] Filed: Mar. 5, 1990

Related U.S. Application Data

[63] Continuation-in-part of Ser. No. 270,892, Nov. 14, 1988, abandoned, which is a continuation-in-part of Ser. No. 945,743, Dec. 23, 1986, abandoned.

[51] Int. Cl.$^5$ ............................................. A23G 3/30
[52] U.S. Cl. ........................................... 426/5; 426/96
[58] Field of Search ......................................... 426/3-6, 426/96

[56] References Cited

U.S. PATENT DOCUMENTS

| | | | |
|---|---|---|---|
| 3,795,744 | 3/1974 | Ogawa et al. | 426/3 |
| 4,088,788 | 5/1978 | Ream et al. | 426/3 |
| 4,151,270 | 4/1979 | Ream et al. | 426/3 |
| 4,217,368 | 8/1980 | Witzel | 426/5 |
| 4,740,376 | 4/1988 | Yang | 426/651 |
| 4,800,091 | 1/1989 | Glass et al. | 426/5 |
| 4,931,293 | 6/1990 | Cherukuri et al. | 426/96 |

Primary Examiner—Jeanette Hunter
Attorney, Agent, or Firm—Daniel A. Scola, Jr.; Craig M. Bell; Richard S. Bullitt

[57] ABSTRACT

An improved food acid delivery system that effects a controlled release of the acid provides prolonged sourness, flavor and juiciness duration in chewing gums, pharmaceuticals and other confections. The food acid is encapsulated in a matrix comprised of an emulsifier and a polyvinyl acetate, the type of which is selected according to the water solubility of said food acid. A chewing gum composition employing the delivery system and a method for the preparation of both the delivery system and the gum composition are disclosed.

35 Claims, 3 Drawing Sheets

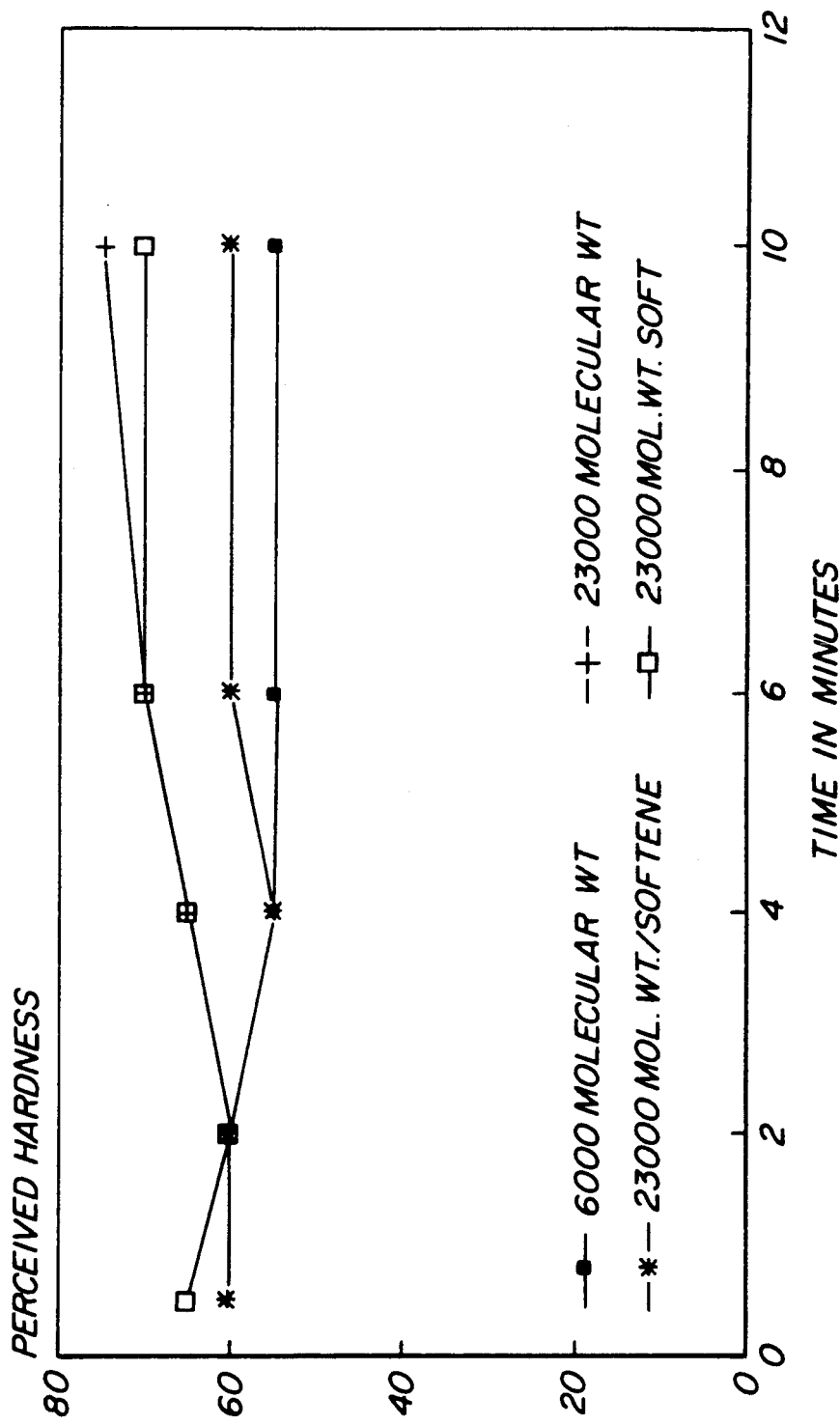

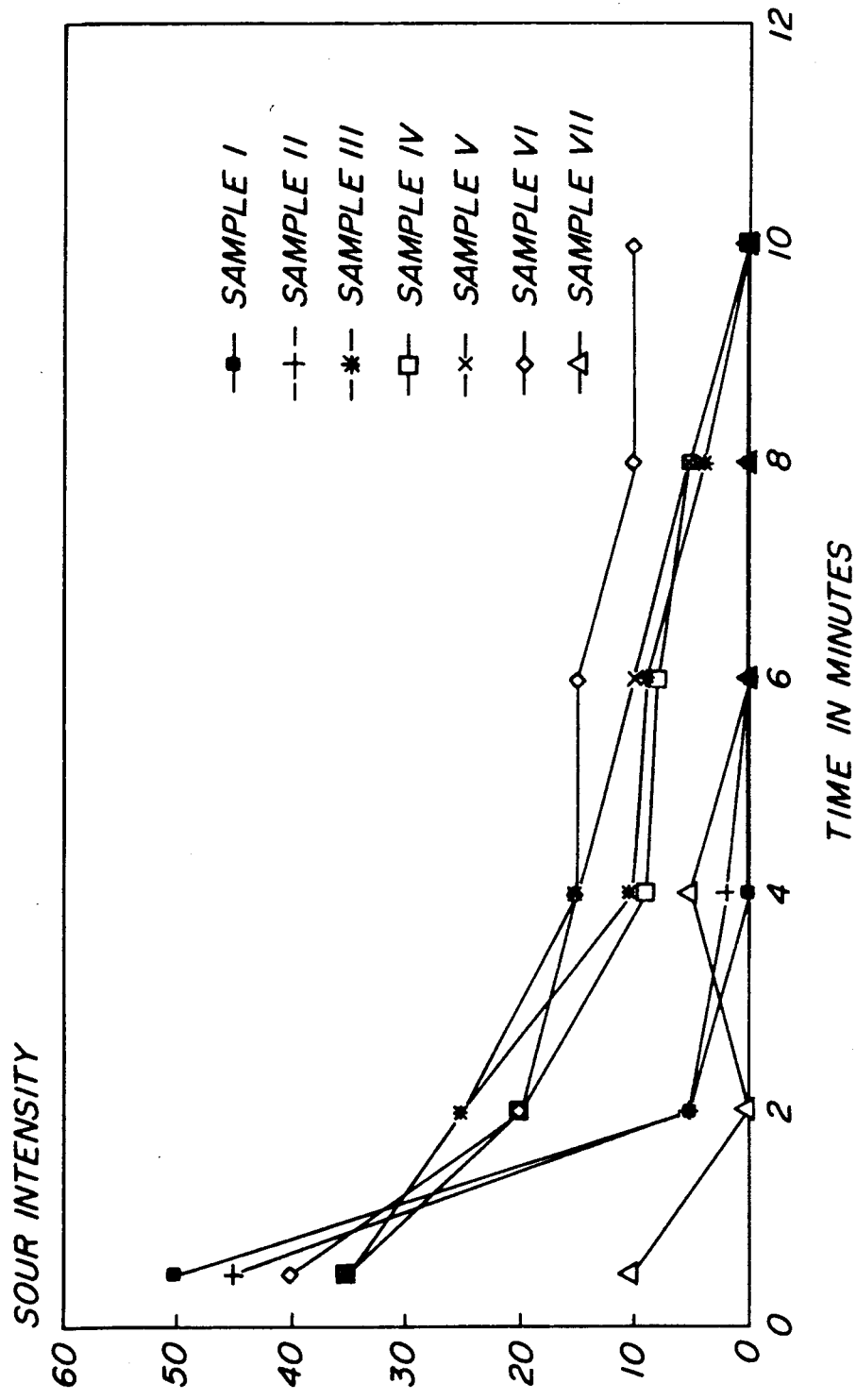

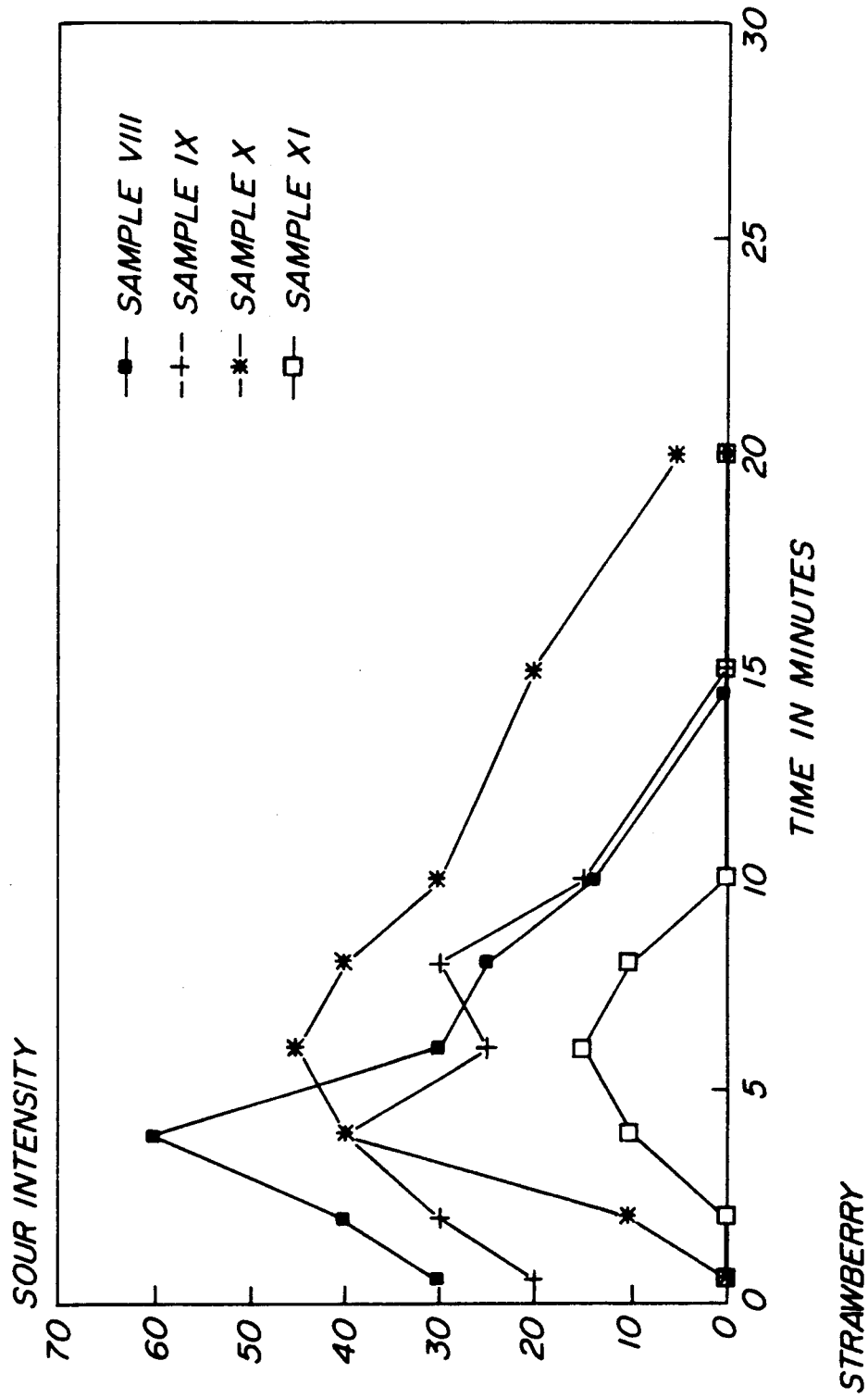

FOOD ACID DELIVERY SYSTEMS CONTAINING POLYVINYL ACETATE

RELATED INVENTIONS

This application is a continuation-in-part of U.S. Ser. No. 270,892 filed on Nov. 14, 1988, now abandoned which in turn is a continuation-in-part of U.S. Ser. No. 945,743, filed Dec. 23, 1986 now abandoned.

FIELD OF THE INVENTION

This invention relates to a delivery system for food acids designed to be incorporated into chewing gum and confectionery compositions to impart prolonged tartness, sourness and increased salivation. More particularly, this invention relates to a method of protecting food acids from being adversely affected from such factors as moisture, pH, temperature and other reactive chemical ingredients. While the inventive delivery system is particularly useful for delivering food acids and sweeteners, it may also have applications for flavors, drugs and the like.

BACKGROUND OF THE INVENTION

In co-pending application U.S. Ser. No. 945,743 filed Dec. 23, 1986 the instant delivery system was used to deliver sweeteners. Also in co-pending application U.S. Ser. No. 270,892 it was found that the present delivery system using low molecular weight polyvinyl acetate could be utilized to deliver food acids. It has now been discovered that the delivery system also has the capability of delivering food acids over an extended chewing period utilizing polyvinyl acetate with higher molecular weights up to and exceeding 50,000.

The art has disclosed the addition of food acids to chewing gum compositions in order to achieve the desired sourness effect, particularly in citrus fruit flavors. Generally, the acids are added directly to the water-soluble chewing gum portion of the chewing gum composition to ensure the release of the acid during mastication. For Example, U.S. Pat. Nos. 4,088,788 and 4,151,270, both to Ream et al. disclose the addition of at least 3% by weight of one or more organic acids in combination with a sweetener to achieve an alleged synergistic saliva stimulating effect. The acids disclosed are added directly to the gum composition in their free form without mention of coating or encapsulation.

Another example of the use of food acids being added directly in their free form to a chewing gum composition is disclosed in U.S. Pat. No. 4,085,227 to Mackay et al. This patent disclosed both poorly water-soluble and water soluble food acids being added to the gum base portion of the chewing gum composition. According to the disclosure of this patent, the acids must be in the particle range of less than 150 microns. Numerous gum base materials are mentioned, among which is polyvinyl acetate. Gum base is disclosed as being present in amounts of about 10-50% by weight. No specific range of molecular weight is mentioned with regard to gum base elastomers in general or specifically to polyvinyl acetate.

Another example of the incorporation of free acids in a chewing gum composition is U.S. Pat. No. 4,800,191 wherein a gum is disclosed with prolonged juiciness and flavor through the incorporation of a premixed blend of acids having different organic/aqueous partitioning coefficients such that they have sequential release rates during mastication.

Although the art has concentrated on direct addition of food acids to chewing gum rather than encapsulation of the acid, encapsulation is disclosed in U.S. Pat. No. 3,795,744 to Ogawa et al. This patent discloses various "seasonings," among which are included acidifying agents, the "seasonings" being coated or encapsulated with high molecular weight compounds. Among the encapsulating compounds disclosed are: starches, cellulose, proteins, gums, polyvinyl alcohol, low molecular weight polyethylene and polyvinyl esters such as polyvinyl acetate, polyvinyl propionate, a graft-copolymer of polyvinyl propionate and polyvinyl acetate, a copolymer of vinyl acetate and ethylene, propylene, acrylic and methacrylic acid, crotonic acid, maleic acid and esters of unsaturated acids thereof. The polymers have a polymerization degree of 200-1500 and their mixtures are also disclosed as being useful.

The claims of the Ogawa reference are directed to a method of preparing a chewing gum which can variably release different flavors due to the encapsulated "seasoning" particles comprising the steps of: dissolving about 2-30% by weight polyvinyl ester in a solvent selected from the group consisting of ethanol, ethylacetate and mixtures thereof, and homogeneously dispersing a flavor agent in the amount of 1-20 times the weight of the polyvinyl ester content; adding to this first solution a second solvent which is miscible with said first solvent but is a nonsolvent for said polyvinyl ester, said second solvent being selected from the group consisting of hexane, whereby said polyvinyl ester precipitates out in the form of discrete particles which encapsulate the "seasoning," e.g. food acids. These encapsulated particles are added to a chewing gum composition.

In addition to the above-mentioned art concerning the addition of food acids, the use of encapsulated sweeteners and flavors in chewing gum compositions is well known. Numerous patents have disclosed coatings for sweeteners in an attempt to delay or prolong sweetness, as well as to stabilize those sweeteners, such as aspartame, which are sensitive to moisture, temperature and pH. U.S. Pat. No. 4,384,004 to Cea et al., discloses solid particles of aspartame encapsulated by a coating material selected from the group consisting of cellulose, cellulose derivatives, arabinogalactin, gum arabic, polyolefins, waxes, vinyl polymers, gelatin, zein and mixtures thereof, wherein the amount of said coating material to said methyl ester is from 1:1 to 1:10. More particularly, the coating materials include cellulose, methyl cellulose, ethyl cellulose, cellulose nitrate, cellulose acetate phthalate, carboxymethyl cellulose, hydroxyethyl cellulose, hydroxypropyl cellulose, arabinogalactan; polyethylene, polymethacrylates, polyamides, ethylenevinyl acetate copolymers, polyvinylpyrrolidone; gum arabic; paraffin wax, carnauba wax, spermaceti, beeswax; stearic acid, stearyl alcohol, glyceryl stearate; gelatin, zein and mixtures thereof.

The method of coating employed in the Cea et al reference includes suspending the aspartame particles in a stream of air that passes through a zone of atomized liquid droplets of the coating material, so that the coating material is deposited on the surface of the aspartame. More than one coating may be used whereby the inner coating is water-soluble and the outer coating is water-insoluble.

U.S. Pat. No. Nos. 4,122,195 and 4,139,939, both to Bahoshy et al., fix aspartame by preparing it with a material such as gum arabic or the reaction product of a compound containing a polyvalent metallic ion, with an ungelatinized starch acid-ester of a substituted dicarboxylic acid, by a spray drying technique, where the aspartame and a film former are prepared in an emulsion.

U.S. Pat. No. 4,374,858, to Glass et al., discloses an aspartame sweetened chewing gum having improved sweetness stability wherein the chewing gum piece has aspartame coated on its surface, as opposed to incorporating it in the chewing gum mix.

EPA 81110320.0, published June 16, 1982 (Publication No. 0,053,844), to Ajinomoto Co., Inc., discloses a stabilized depeptide-based sweetening composition comprising (a) from 20 to 60% by weight of solid fat, (b) from 10 to 30% by weight emulsifier, (c) from 10 to 30% by weight polysaccharide and (d) not more than 30% by weight of dipeptide sweetener. The compositions are prepared by heating the mixture of the ingredients, cooling, and pulverizing them in order to obtain a powder or granule of the composition with an ASTM mesh size of smaller than 12. Spray drying the mixture is also disclosed.

U.S. Pat. No. 4,105,801 to Degliotti, discloses a confectionery comprising a core portion and a shell adheringly enveloping the core portion, whereby the shell is formed by an intimate mixture of microcrystals of xylitol with a solid fatty substance in a proportion of 0.5 to 15 parts by weight of fatty substance to each 100 parts by weight of xylitol. The fatty substance is preferably a mono-, di- or triglyceride having a melting range of between 20° and 60° C.

U.S. Pat. No. 3,389,000 to Toyonaka et al., discloses protective coatings for granular nucleoside-5-phosphates, the coatings being edible fats melting between 40°-100° C. and derived from plants and animals. Examples of hydrogenated oils used are soybean oil, cottonseed oil, almond oil, castor oil, linseed oil, mustard oil, olive oil, grapefruit seed oil, palm oil, palm kernel oil, rapeseed oil, rice bran oil and the like and mixtures thereof. This reference discloses a process of preparing the granular product from a liquid mixture of fats and nucleoside-5-phosphates which are sprayed from a pressure nozzle and the resultant granules cooked and recovered.

U.S. Pat. No. 4,382,924, to Berling, discloses liquid oral dosage forms for vitamins or pharmaceutical materials comprising an edible oil, a high potency lipid soluble sweetener such as saccharin and a lipid soluble flavorant. The edible oil may be a polyol fatty acid ester having at least four fatty acid ester groups and each fatty acid having from about 8 to about 22 carbon atoms. The oil, sweetener and flavor oil are mixed and heated and then cooled to provide a palatable liquid dosage form.

For a general discussion of spraying fatty materials onto sweeteners and the like see U.S. Pat. Nos. 3,949,094 and 3,976,794 both to Johnson, and U.S. Pat. No. 3,867,556 to Darragh. U.S. Pat. No. 4,293,572 to Silva et al., discloses the application of a dispersion of an emulsified fat with a solution of dextrin, saccharin or a polysaccharide to a food product as a barrier against moisture. U.S. Pat. No. 3,527,647 discloses a process of agglomerating particles by randomly scattering and spraying moistened particles to cause them to collide and form agglomerates.

The problem relating to stabilization of certain core materials relates to the surface wettability of the material as well as to its morphological configuration. For example, in the case of certain sweeteners, this is of particular importance. Aspartame is known to be rodlike, needle-like or dendritic in shape. As a result it is very difficult to coat aspartame using ordinary mixing or spray coating techniques. To be effective as protective barriers, coatings must be able to wet and adhere to the crystalline surface, including the needle-like tips and other shape variations of the aspartame. Additionally, the coating must be capable of being applied in a film with a uniform thickness sufficient to provide a barrier against degradative factors such as moisture, pH changes, temperature changes and reactive chemicals. The coatings, in addition to being protective barriers, must be flexible enough to conform to the surface irregularities and geometrical configuration without cracking due to mechanical stresses which it is subjected to during incorporation of the sweetener into specific product applications. Attempts to coat aspartame using spray techniques to apply simple mixtures of fat and lecithin have resulted in poor wetting, spotty coating and inadequate protection against moisture and other potentially degradative factors.

The process of EPA 81110320.9 (Publication No. 0053844) filed Dec. 10, 1981, discussed above, is an example of simple admixing of coating materials with aspartame. This publication discloses the simple melting and admixing of from 20 to 60% of solid fat, 10 to 30% of emulsifier, 10 to 30% of polysaccharide and not more than 30% dipeptide sweetener. The mixture is then cooled and pulverized or spray dried. The pulverizing of the mixture into fine powder, however, results in a rupturing of the coating, leaving the aspartame exposed. Spray drying is normally associated with the driving off of moisture or solvents.

U.S. Pat. No. 4,597,970 discloses a delivery system wherein a sweetener is coated with a mixture of fatty acid or wax, lecithin and monoglyceride.

The instant invention seeks to provide coating compositions which eliminate the need for the fatty acid or wax component, yet still provides adequate protection and delayed release of the sweetener, food acid or other actives contained therein.

The prior art techniques for coating difficult to coat materials such as food acids or aspartame, has focused on two methods. The first method involves the formation of a molten mixture of the coating material with the sweetener. The mixture is then solidified by cooling and pulverized. The resultant particles represent a random attempt at completely coating or enrobing the sweetener. In the case of aspartame, this coating does not provide adequate protection against moisture or aldehyde-containing flavor oils and instability of the aspartame results.

The second conventional prior art technique for coating materials involves fluidized bed spray coating. This technique involves suspending a mass of the material to be coated into a stream of atomized droplets of coating material. In the case of materials such as aspartame, this method is very difficult. Aspartame is a low density material, has a large surface area to weight ratio and poor wetting characteristics. For these reasons, spray coating of aspartame in a fluidized bed system is difficult.

The instant process is an improvement over spray congealing techniques and includes additional coating steps. The resultant product exhibits a marked improvement in the effectiveness of the coating as a protective barrier by tailoring the type of polyvinyl acetate selected to the type of food acid sought to be encapsulated. The result is a significant improvement in the controlled and sustained release of the core material.

Thus, the delivery systems of the invention and process of preparation provide an improved protective coating which results in a controlled sequential release of the core materials such as food grade acids. The delivery systems have a variety of other advantages including the controlled release of other materials such as sweeteners and flavoring agents. Other advantages will become apparent herein.

SUMMARY OF THE INVENTION

It has been discovered that a delivery system for food acids can be made using a coating formed from the combination of an emulsifier with polyvinyl acetate. This coating provides an effective barrier against moisture and other conditions such as reactive agents, pH changes and the like. When applied to food acids, these coatings effectuate sustained release of the acid, thereby extending the period of sourness perception, increased salivation and overall enjoyment of the chewing gum or confection.

More specifically, it has been found that a delivery system for food acids can be tailor-made to assure the most effective sustained release of a food acid based on the water solubility of that particular acid. This is achieved through the selection of a polyvinyl acetate based upon its molecular weight. The molecular weight of the polyvinyl acetate selected is dictated by the type of food grade acid to be incorporated.

This invention also concerns chewing gum compositions having prolonged acid release (sourness) during mastication comprising a gum base and a stable food acid delivery system capable of effecting a controlled release of the acid comprising:

A. At least one food acid selected from the group consisting of citric acid, malic acid, ascorbic acid, glucono delta-lactone, tartaric acid, adipic acid, fumaric acid, succinic acid, lactic acid and mixtures thereof;

B. An emulsifier selected from the group consisting of lecithin, stearates, ester derivatives of stearates, palmitates, ester derivatives of palmitates, oleates, ester derivatives of oleates, glycerides, ester derivatives of glycerides, sucrose polyesters. polyglycerolesters, and animal waxes, vegetable waxes, synthetic waxes, petroleum wax and mixtures thereof; and C. polyvinyl acetate present in amounts of about 30% to about 93% by weight of the total composition and having a molecular weight of about 2,000 to about 65,000 depending upon the food acid to be coated.

DESCRIPTION OF THE DRAWINGS

FIG. I is a graph depicting the results of expert chew panel studies of chewing gum compositions with food acids coated with high and low molecular weight polyvinyl acetate and the respective perceived hardness in the chew for each.

FIG. II is a graph depicting the results of expert chew panel studies of chewing gum compositions utilizing the delivery systems of the present invention whereby the intensity of sour taste attributable to citric acid (high water solubility) is measured over time.

FIG. III is a graph depicting the results of expert chew panel studies of chewing gum compositions utilizing the delivery system of the present invention whereby the intensity of sour taste attributable to adipic acid (low water solubility) is measured over time.

DETAILED DESCRIPTION OF THE INVENTION AND PREFERRED EMBODIMENTS

The combination of polyvinyl acetate and the aforementioned emulsifiers produces coatings which form excellent films on the food acids. These coatings are substantially poorly water soluble and protect the food acid or other encapsulated material from hydrolytic degradation. Yet, they possess sufficient hydrophilic character to swell to some degree in the presence of water, thereby slowly releasing the core material. Glyceryl monostearate is the most preferred emulsifier because it has been found to have the unexpected property of inhibiting the hydrolysis of polyvinyl acetate to acetic acid and polyvinyl alcohol. Other advantages can be enumerated: For example, the coatings are non-cariogenic; the cold flow properties of polyvinyl acetate is reduced during prolonged storage; the method of making the delivery system does not employ the use of solvents; and the delivery system can be used in any food, chewing gum, confectionery, personal product or pharmaceutical application where it is desirable to protect a food acid or mixtures of a food acid and sweetener from moisture. Other advantages of the instant invention will become apparent.

The delivery system is prepared by melting the desired ratios of polyvinyl acetate and emulsifier and mixing them at a temperature of about 85° C. for a short period of time, e.g., 5 minutes or more. Once these materials are sufficiently melted and a homogenous mixture is obtained, the proper amount of solid food acid is added and blended into the molten mass thoroughly for an additional short period of mixing. It is preferred that the food acid particles are milled or ground into a fine powder before encapsulating with the polyvinyl acetate/emulsifier mixture. The resultant mixture is a semi-solid mass which is then cooled to obtain a solid, e.g., at about room temperature, and ground to a U.S. standard mesh size of about 30 to about 200 (600–75 microns).

The instant delivery system can be incorporated in a number of ingestible products such as food products, confections and the like, as well as chewing gum compositions, pharmaceutical preparations, denture products, mouthwash and the like.

The resultant product of this invention is in powder or granulated form. The particle size is not critical to the delivery system and can be adjusted to accommodate a particular desired release rate and mouthfeel, depending on the vehicle, e.g., chewing gum or confection, in which it is incorporated. The product can be used "as is" for various applications, e.g., as a topping on baked goods or as an additive in a denture adhesive or mouthwash. The coating matrix is useful for a variety of core materials in addition to food acids, such as sweeteners, spray dried flavors, drug and other particulate materials which require a coating for protection, controlled release or for taste-masking. These core materials can be used either singly or in combination in either a single or multiple delivery system. That is, one or more of these materials may be present within one coating matrix or coated individually by the matrix and employed alone or in combination in a final product. The food acids can also be encapsulated with different amounts or thicknesses of coating such that the acids release sequentially.

The food acids, also commonly referred to as acidulents in the food industry, may be present in amounts of about 0.1% to about 10% by weight of the total chewing gum composition, preferably in amounts of about 0.5% to about 7.5% and most preferably in amounts of about 1% to about 2.5%. In terms of their presence in the delivery system per se, the acids are present in amounts of about 1% to about 50% and preferably about 20% to about 40% by weight of the delivery system. The particular amount of acid present must be balanced with the desired amount of sourness desired. Too much or too little acid will not achieve the effect of extended flavor, desired tartness and pleasant taste.

The polyvinyl acetate (PVA) coatings of the present invention result in an improved sustained release acid of the food acids to the organoleptic sensory system through the use of specific molecular weight PVA's selected according to the water solubility of the food acid to be encapsulated. Food acids with low water solubility characteristics such as adipic, fumaric and lactic acid exhibit the best sustained release action when coated with PVA's possessing molecular weights in the range of 2,000–18,000, preferably 6,000–10,000. Food grade acids with medium water solubility characteristics such as malic and glucono delta-lactone exhibit the best sustained release results when coated with PVA's possessing molecular weights of from about 15,000–25,000, preferably 16,000 to about 22,000. Finally, food acids with high water solubility characteristics such as citric or tartaric acid, exhibit the best sustained release action when coated with PVA's that have molecular weights in the range of from about 20,000 to 65,000, preferably 20,000 to about 35,000.

The acids may be encapsulated alone or in combination with sweeteners, flavors or similar conventional chewing gum ingredients provided the ingredients are compatible. Alternatively, encapsulated sweetener or flavor can be added separately from the instant food acid delivery system, to provide a unique combination of release properties. The combination of certain flavors, sweeteners and acids have been found to create synergistic effects of longer and more intense flavor, sweetness, sourness and juiciness (saliva stimulation). In particular, the prolongation of acid release gives the chewer the distinct perception of longer taste. Although this phenomenon is not completely understood, it is clear from testing that such taste prolongation exits and can be perceived by the chewer as a substantial improvement over an extended period of mastication.

If an encapsulated sweetener component is to be added, it may be selected from solid natural or synthetic sweeteners capable of imparting high intensity sweetness. A non-limiting list of these sweeteners include amino acid-based sweeteners, dipeptide sweeteners, glycyrrhizin, saccharin and its salts, acesulfame salts, cyclamates, steviosides, talin, dihydrochalcone compounds, chlorinated sucrose polymers such as sucralose, and mixtures thereof.

The sweeteners which are optionally part of the delivery system may be used in amounts necessary to impart sweetness and preferably are incorporated in amounts of about 0.01 to about 30% by weight of the delivery system. Aspartame, saccharin and its salts are the preferred sweeteners and may be used in amounts of about 0.01% to about 50% and about 0.01% to 50% respectively, by weight of the delivery system. The preferred amounts of these sweeteners are about 10% to about 20%, most preferably about 14% to about 18% by weight of the delivery system. Auxiliary sweeteners may be used in the final product, i.e., in a chewing gum composition, in conventional amounts standard in the industry.

A particularly effective combination of sweeteners is aspartame, sodium saccharin and acesulfame-K (potassium acesulfame). Saccharin and its salts and acesulfame salts may be employed in amounts of about 5 to about 50% by weight of the delivery system. Aspartame is used in amounts up to about 15% by weight when used in this combination. One or more of the sweeteners may be in the encapsulated form prior to incorporation in the delivery system, thus delaying the release of the sweetener and lengthening the perceptible sweetness and/or staggering their release. Thus, the sweeteners may be incorporated such that they release sequentially.

It has also been discovered that the incorporation of the combination of two or more sweeteners as part of the delivery system improves the sweetness intensity as a result of synergism. Exemplary examples of synergistic combinations are: saccharin/aspartame; saccharin/potassium acesulfame; saccharin/aspartame/potassium acesulfame. These sweeteners can also be added to the final food confectionery, drug or personal product independently of the delivery system. Thus, a good product may have sweetness imparted thereto attributable to the delivery system sweetness as well as those auxiliary sweeteners independent of the delivery system. These combinations of sweeteners have also been discovered to impart a long lasting flavor effect to the food product such as chewing gum.

Useful flavoring agents may be chosen from synthetic flavoring liquids and/or liquids derived from plants, leaves, flowers, fruits and so forth, and combinations thereof. Representative flavoring liquids include: spearmint oil, cinnamon oil, oil of wintergreen (methysalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight of the final chewing gum composition are usable with amounts of about 0.3% to about 1.5% being preferred and about 0.7% to about 1.2% being most preferred.

With regard to chewing gum formulations in which the novel delivery system is employed, the amount of gum base employed will vary greatly depending on various factors such as the type of base used, consistency desired and other components used to make the final product. In general, gum base amounts of about 5% to about 85% by weight of the final chewing gum composition are acceptable for use. Preferably, in standard chewing gum compositions the amounts of about 15% to about 25% by weight are utilized. In reduced calorie gum formulations, preferred gum base amounts range from approximately 65% to about 75% by weight. The gum base may be any water-in soluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight of the gum base.

Plasticizers or softeners such as lanolin, stearic acid, sodium stearate, potassium stearate, glyceryl triacetate and glycerine may be used in the gum base composition. Natural waxes, petroleum waxes such as polyurethane waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

When high molecular weight PVA's (30,000–65,000) are used to encapsulate highly water soluble food acids such as citric or tartaric acid, the higher density of these compounds tends to result in a too firm, almost hard chew when incorporated into chewing gum compositions despite the addition of softening agents such as partially hydrogenated soybean oil or glycerol monostearate. It was surprisingly found that up to a certain point, the high molecular weight PVA will only absorb so much of these softeners. It was discovered however, that the incorporation of two additional softening agents, glycerol triacetate or acetylated monoglyceride further softens the hard chew so the composition is more acceptable. This perceived hardness in the chew according to the molecular weight of the PVA used is graphically depicted in FIG. I.

The chewing gum composition may additionally include the conventional additives of flavoring agents, coloring agents such as titanium dioxide; emulsifiers such as lecithin; and additional fillers such as aluminum hydroxide, alumina, aluminum silicates, calcium carbonate, talc and combinations thereof. These fillers may also be used in the gum base in various amounts. Preferably the amount of fillers when used will vary about 4% to about 30% by weight of the final chewing gum.

In the instance where auxiliary sweeteners are utilized in addition to those in the delivery system, the present invention contemplates the inclusion of those sweeteners well known in the art, including both natural and artificial sweeteners. Thus, additional sweeteners may be chosen from the following non-limiting list: sugars such as sucrose, glucose (corn syrup), dextrose, invert sugar, fructose, and mixtures thereof; chlorinated sucrose derivatives such as sucralose; saccharin and its various salts such as the sodium or calcium salt; cyclamic acid and its various salts such as the sodium salt; the dipeptide sweeteners such as aspartame; dihydrochalcone compounds; glycyrrhizin; *Stevia Rebaudiana* (Stevioside); and sugar alcohols such as sorbitol, sorbitol syrup, mannitol, xylitol, and the like. Also contemplated as an additional sweetener is the non-fermentable sugar substitute (hydrogenated starch hydrolysate) which is described in U.S. Reissue patent 26,959. Also useful is the synthetic sweetener 3,6-dihydro-6-methyl-1-1,2,3-oxathiazin-4-one-2,2dioxide particularly the potassium (Acesulfame-K), sodium and calcium salts thereof as described in U.S. Pat. Nos. 3,689,486 and 3,926,976.

Suitable flavorings include both natural and artificial flavors. Mints such as peppermint, menthol, artificial vanilla, cinnamon, various fruit flavors, used individually or in admixture, are contemplated. The flavorings are generally utilized in amounts that will vary depending upon the individual flavor, and may, for example, range in amounts of about 0.5% to about 3% by weight of the final chewing gum composition weight. The flavorings may be present in the delivery system, in the chewing gum composition itself, or both.

The colorants useful in the present invention, include the pigments such as titanium dioxide, which may be incorporated in amounts of up to about 6% by weight, and preferably up to about 1% by weight. Also, the colorants may include other dyes suitable for food, drug and cosmetic applications, and known as F.D. & C. dyes and the like. The materials acceptable for the foregoing spectrum of use are preferably water-soluble. A full recitation of all F.D. & C. and D. & C. and their corresponding chemical structure may be found in the Kirk-Othmer Encyclopedia of Chemical Technology, in Volume 5, at Pages 857–884.

The chewing gums of the invention may be in any form known in the art, such as stick gum, slab gum, chunk gum, shredded gum, hard coated gum, tabletted gum, as well as center-filled gum.

The process of preparing the inventive chewing gum compositions is as follows. The gum base is melted (about 85° to about 90°), cooled to 78° C. and placed in a pre-warmed (60° C.) standard mixing kettle equipped with sigma blades. The emulsifier is then added and mixed in. Next, a portion of the bulk sweetener and the softener (e.g. glycerin) is added and mixed in for an additional 3 to 6 minutes. The mixing kettle is cooled and the remainder of the sweetener and softener are then added and mixing is continued. At the time, the unflavored chewing gum temperature is about 39°–42° C. Flavor oil is then added and incorporated into the base and the mixing is continued. Finally, the delivery system containing the food acid is added and mixed for an additional 1 to 10 minutes. The delivery system is added as the last ingredient, along with artificial high intensity sweeteners, if any. The final gum temperature is about 39° C. to about 48° C. The chewing gum composition is then discharged from the kettle, rolled, scored and formed into chewing gum pieces.

More generally, this invention relates to a method of preparing a chewing gum composition having improved sustained sweetener release properties which comprises:

(1) Preparing a food acid delivery system wherein the food acid is protected by an encapsulation prepared by the process comprising:

(A) entrapping a particulate food acid in a polyvinyl acetate coating comprising the steps of melting and blending the polyvinyl acetate with an emulsifier and dispersing the food acid uniformly therein; cooling the mixture at ambient temperature while continuing to mix;

(B) grinding the resultant mixture to the desired particle size;

(2) Adding the resultant delivery system to a homogeneous mixture of a gum base and remaining chewing gum ingredients; and (3) Forming the resultant mixture into suitable chewing gum shapes.

The type of polyvinyl acetate selected is determined by the molecular weight of the PVA and depends upon the water solubility of the acid to be encapsulated. The lower the water solubility characteristics of the respective food grade acid, the lower the molecular weight of the PVA to be used. Optionally, the delivery system particles can be coated with an additional hydrophobic coating comprising a fat or wax blended with an emulsifier. Conventional, fluidized bed techniques can be used for obtaining these additional coatings.

The following examples serve to provide further appreciation of the invention but are not meant in any way to restrict the effective scope of the invention. All percentages throughout the specification are by weight % of the final delivery system unless otherwise indicated.

EXAMPLE I

The following compositions A-F are representative of the inventive delivery systems. These compositions were prepared in accordance with the method previously described in the specification. Citric acid, a food grade acid possessing a high solubility in water (118 gms./100 ml H$_2$O at 25° C.) was encapsulated in the following materials. The numbers reflect the material on a percent by weight basis.

TABLE I

| INGREDIENTS | Delivery Systems | | | | | |
| --- | --- | --- | --- | --- | --- | --- |
| | SAMPLE A | SAMPLE B | SAMPLE C | SAMPLE D | SAMPLE E | SAMPLE F |
| CITRIC ACID | 29.67 | 29.67 | 29.67 | 35.0 | 40.0 | 45.0 |
| GLYCEROL MONOSTEREATE | 10.0 | 10.0 | 8.5 | 5.0 | 2.0 | 2.0 |
| ACETYLATED MONOGLYCERIDE | — | — | 1.5 | 2.0 | 3.0 | 3.0 |
| DURKEE 17* | 10.0 | 10.0 | 10.0 | 3.0 | 2.0 | 2.0 |
| PVA/AYAC** | 50.33 | 25.665 | 25.665 | 27.5 | 20.0 | 14.0 |
| PVA/B-30*** | — | 24.665 | 24.665 | 27.5 | 33.0 | 34.0 |

*Partially Hydrogenated Soybean Oil
**Polyvinyl Acetate (Mol. wt. 2,000–14,000)
***Polyvinyl Acetate (Mol. wt. 30,000–55,000)

Once the delivery systems were prepared, they were further ground to obtain the desired mesh size, i.e., about 30 to about 200 U.S. standard mesh (600–75 microns). A second coating of fat or wax and glycerol monostearate blend was applied on some of the above compositions using conventional fluidized bed granulation techniques. This second coating, although not required, is useful in applications where prolonged exposure to acid pH, water or high temperature is likely. The second coating also assures that rod-like or irregularly shaped core materials such as aspartame are adequately coated.

Each of the inventive delivery systems in Table I were incorporated into the chewing gum compositions of Table II and chewing gum product was produced therefrom using conventional processing techniques common to the art. The numbers of the table reflect the amounts of the respective ingredients on a percent by weight basis.

TABLE II

| INGREDIENTS ENCAPSULATION | SAMPLE I FREE | SAMPLE II A | SAMPLE III B | SAMPLE IV C | SAMPLE V D | SAMPLE VI E | SAMPLE VI F |
| --- | --- | --- | --- | --- | --- | --- | --- |
| GUM BASE/ SOFTENERS | 29.06 | 29.06 | 29.06 | 29.06 | 29.06 | 29.06 | 29.06 |
| CARBOHYDRATES | 57.27 | 54.9 | 54.9 | 54.9 | 55.41 | 55.77 | 56.0 |
| CITRIC ACID | 1.0 | 3.37 | 3.37 | 3.37 | 2.86 | 2.5 | 2.2 |
| GLYCERIN | 11.0 | 11.0 | 11.0 | 11.0 | 11.0 | 11.0 | 11.0 |
| FLAVOR | 1.4 | 1.4 | 1.4 | 1.4 | 1.4 | 1.4 | 1.4 |
| SWEETENERS | 0.27 | 0.27 | 0.27 | 0.27 | 0.27 | 0.27 | 0.27 |

FIG. II graphically demonstrates the results of the expert chew panel studies using the chewing gum compositions from table II above. Panelists were asked to chew separate samples of a strawberry flavored gum comprised of Sample I in which the free, unencapsulated citric acid is incorporated and were asked to compare it with Samples II–VII in which the different encapsulants were used from table I. Perceived sour taste attributable to the presence of citric acid was measured in terms of its intensity over time. The graph plots the results of the amount of acid released during mastication as subjectively evaluated by the panelists at the various time intervals. It is clear from an analysis of the graph that the sour taste attributable to the free, unencapsulated acid in Sample 1 dropped off dramatically in a very short time whereas the various encapsulated compositions lasted for quite some time, far longer than the free acid alone.

EXAMPLE II

The following compositions G, H, I disclose the present invention using a food grade acid with low water solubility characteristics. Adipic acid, which has a water solubility of 1.9 gms/100 ml. H$_2$O at 25° C., was encapsulated in the three samples as set forth in table III. Again, the numbers reflect the amount of the respective material on a percent by weight basis.

TABLE III

| INGREDIENTS | Delivery Systems | | |
|---|---|---|---|
| | SAMPLE G | SAMPLE H | SAMPLE I |
| ADIPIC ACID | 40.0 | 29.67 | 30.0 |
| GLYCEROL MONOSTEARATE | 2.0 | 10.0 | 8.0 |
| ACETYLATED MONOGLYCERIDE | 1.0 | — | 2.0 |
| DURKEE 17* | 2.0 | 10.0 | 10.0 |
| PVA(AYAC)** | 45.0 | 50.33 | 25.0 |
| PVA(B-30)*** | 10.0 | — | 25.0 |

*Partially Hydrogenated Soybean Oil
**Polyvinyl Acetate (Mol. wt. 2,000–14,000)
***Polyvinyl Acetate (Mol. wt. 30,000–55,000)

The delivery systems containing adipic acid were again ground to the desired mesh size and coated as set forth in Example I. The delivery systems were then incorporated into the three chewing gum compositions of table IV and a fourth control comprising an unencapsulated free acid was prepared for comparative purposes as well.

TABLE IV

| INGREDIENTS | SAMPLE VIII FREE | SAMPLE IX G | SAMPLE X H | SAMPLE XI I |
|---|---|---|---|---|
| GUM BASE | 29.06 | 29.06 | 29.06 | 29.06 |
| SOFTENERS | | | | |
| CARBOHYDRATES | 57.27 | 54.9 | 55.77 | 54.94 |
| ADIPIC ACID | 1.0 | 3.37 | 2.5 | 3.33 |
| GLYCERIN | 11.0 | 11.0 | 11.0 | 11.0 |
| FLAVOR | 1.4 | 1.4 | 1.4 | 1.4 |
| SWEETENERS | 0.27 | 0.27 | 0.27 | 0.27 |

FIG. III graphically demonstrates the results of expert chew panel studies using the gums from table IV as panelists were again asked to chew strawberry flavored gum wherein the tart, sour flavor is attributable to the presence of adipic acid. Clearly Sample X which had the delivery system of adipic acid encapsulated by low molecular weight polyvinyl acetate gave a sour intensity for the longest duration and the most gradual decline. Whereas the free acid gave a sharper, more immediate release and intensity, the sour taste also dissipated much quicker. Adipic acid encapsulated with a 50/50 blend of high and low molecular weight PVAs (Sample XI) was hardly released from the gum at all and lasted the shortest duration of all four samples since the high molecular weight PVAs together with the acid's low water solubility combined to entrap the acid in the gum bolus. Once again, this demonstrates the ability of the encapsulating systems of this invention to prolong acid release during mastication, thereby allowing for the perception of longer lasting sourness and acid flavor as well as increased juiciness.

We claim:

1. A chewing gum composition having prolonged sourness flavor and juiciness duration comprising:
   A. a gum base in an amount of from about 5% to about 85% of said gum composition; and
   B. a stable food acid delivery system capable of effecting controlled release acid comprising;
      i. At least one solid food acid in an amount of from about 0.1% to about 10% by weight of said gum composition, said acid selected from the group consisting of citric acid, malic acid, tartaric acid, adipic acid, fumaric acid, succinic acid, glucono delta-lactone, ascorbic acid, lactic acid and mixtures thereof; and
      ii. A coating matrix comprised of a combination of an emulsifier selected from the group consisting of lecithin, stearates, ester derivatives of stearates, palmitates, ester derivatives of palmitates, oleates, ester derivatives of oleates, glycerides, ester derivatives of glycerides, sucrose polyesters, polyglycerol esters, animal waxes, vegetable waxes, synthetic waxes, petroleum wax and mixtures thereof and polyvinyl acetate present in amounts of from about 30% to about 93% by weight of the total composition of said delivery system and having a molecular weight of from about 2,000 to about 65,000, whereby said prolonged sourness flavor and juiciness duration is provided.

2. The chewing gum composition of claim 1 wherein said food acid is selected from the group comprising adipic acid, fumaric acid, lactic acid, ascorbic acid and mixtures thereof.

3. The chewing gum composition of claim 2 wherein said polyvinyl acetate has a molecular weight of about 2,000 to about 18,000.

4. The chewing gum composition of claim 3 wherein said polyvinyl acetate has a molecular weight of 6,000 to about 10,000.

5. The chewing gum composition of claim 1 wherein said food acid is selected from the group consisting of malic acid, glucono-delta lactone and mixtures thereof.

6. The chewing gum composition of claim 5 wherein said polyvinyl acetate has a molecular weight of from 15,000 to about 35,000.

7. The chewing gum composition of claim 6 wherein said polyvinyl acetate has a molecular weight of from 16,000 to about 22,000.

8. The chewing gum composition of claim 1 wherein said food acid is selected from the group consisting of citric acid, tartaric acid and mixtures thereof.

9. The chewing gum composition of claim 1 wherein said polyvinyl acetate has a molecular weight of from 20,000 to about 65,000.

10. The chewing gum composition of claim 9 wherein said polyvinyl acetate has a molecular weight of 20,000 to about 35,000.

11. The chewing gum composition of claim 10 further comprising the addition of a softening agent selected from the group consisting of acetylated monoglyceride, glycerol triacetate and mixtures thereof.

12. The chewing gum composition of claim 1 wherein the food acid is combined with an artificial sweetener prior to encapsulation in the delivery system.

13. The chewing gum composition of claim 12 wherein the sweetener is present in amounts of about 0.01% to about 50% by weight of the delivery system and is selected from the group consisting of artificial high intensity sweeteners and natural sweeteners and mixtures thereof.

14. The chewing gum composition of claim 1 wherein emulsifier is present in amounts of about 0.5% to about 20% by weight of the delivery system.

15. The chewing gum composition of claim 14 wherein the emulsifier is glyceryl monostearate present in amounts of about 2% to about 15% by weight of the delivery system.

16. The chewing gum composition of claim 15 wherein the polyvinyl acetate is blended with a material selected from the group consisting of resins, rosins, terpenes, elastomers, waxes and mixtures thereof.

17. The chewing gum composition of claim 1 wherein the gum base comprises an elastomer selected from the group consisting of resins, rosins, terpenes, elastomers, waxes and mixtures thereof.

18. The chewing gum composition of claim 17 wherein the gum base elastomer is selected from the group consisting of chicle, jetutong, balata, gutta-percha, lechi-capsi, sorva, butadient-styrene copolymers, polyisobutylene, isobutylene-isoprene copolymers, polyethylene, polyvinylacetate, and mixtures thereof.

19. The chewing gum composition of claim 18 wherein the gum base is present in amounts of about 5% to about 45% by weight of the final chewing gum composition.

20. The chewing gum composition of claim 1 wherein there is additionally included fillers, coloring agents, flavoring agents, softeners, plasticizers, elastomers, elastomer solvents, sweetening agents and mixtures thereof.

21. A method of preparing a delivery system useful for delivering food acids comprising the steps of:
(A) entrapping a food acid in a polyvinyl acetate coating comprising the steps of melting and blending the polyvinyl acetate with an emulsifier and dispersing the food acid uniformly therein; cooling the mixture at ambient temperature while continuing to mix;
(B) grinding the resultant mixture to the desired particle size;
(C) optionally coating the particles formed in (B) with a hydrophobic mixture comprising a fat or wax blended with an emulsifier to form an additional protective layer on the delivery, system particles.

22. The method of claim 21 wherein said food acid is present in amounts of about 1% to about 50% by weight of said delivery system.

23. The method of claim 22 wherein said food acid is selected from the group consisting of adipic acid, fumaric acid, lactic acid, ascorbic acid and mixtures thereof.

24. The method of claim 23 wherein said polyvinyl acetate has a molecular weight of from 2,000 to about 18,000.

25. The method of claim 22 wherein said food acid is selected from the group consisting of malic acid and glucono-delta lactone.

26. The method of claim 25 wherein said polyvinyl acetate has a molecular weight of 15,000 to about 35,000.

27. The method of claim 22 wherein said food acid is selected from the group consisting of citric acid, tartaric acid and mixtures thereof.

28. The method of claim 27 wherein said polyvinyl acetate has a molecular weight of 20,000 to about 65,000.

29. A stable food acid delivery system useful in edible products and capable of effecting a controlled release of a food acid comprising:
A. At least one solid food acid selected from the group consisting of citric acid, malic acid, tartaric acid, adipic acid, fumaric acid, glucono delta-lactone, succinic acid, ascorbic acid, lactic acid and mixtures thereof, in an amount of from about 1% to 50% of said acid delivery system; and
B. A coating matrix comprised of a combination of:
  i. An emulsifier selected from the group consisting of lecithin, stearates, esters derivatives of stearates, palmitates, ester derivatives of palmitates, oleates, ester derivatives of oleates, glycerides, ester derivatives of glycerides, sucrose polyesters, polyglycerol esters, animal waxes, vegetable waxes, synthetic waxes, petroleum wax and mixtures thereof; and
  ii. Polyvinyl acetate present in amounts of from about 30% to about 93% by weight of said total composition of delivery system and having a molecular weight of from about 2,000 to about 65,000 whereby said controlled release is provided.

30. The food acid delivery system of claim 29 wherein said food acid is selected from the group consisting of adipic acid, fumaric acid ascorbic acid, lactic acid and mixtures thereof.

31. The food acid delivery system of claim 30 wherein said polyvinyl acetate has a molecular weight of 2,000 to about 18,000.

32. The food acid delivery system of claim 29 wherein said food acid is selected from the group consisting of malic acid, glucono-delta lactone and mixtures thereof.

33. The food acid delivery system of claim 32 wherein said polyvinyl acetate has a molecular weight of 15,000 to about 35,000.

34. The food acid delivery system of claim 29 wherein said food acid is selected from the group consisting of citric acid, tartaric acid and mixtures thereof.

35. The food acid delivery system of claim 34 wherein said polyvinyl acetate has a molecular weight of 20,000 to about 65,000.

* * * * *